United States Patent [19]

McGilp

[11] 3,834,246

[45] Sept. 10, 1974

[54] MOTORCYCLE DRIVE CHAIN TENSIONER KIT

[75] Inventor: Kenneth J. McGilp, Cerritos, Calif.

[73] Assignee: Excel Tool and Die Corporation, Paramount, Calif.

[22] Filed: July 19, 1973

[21] Appl. No.: 380,529

[52] U.S. Cl. .................................... 74/242.11 B
[51] Int. Cl. ............................................ F16h 7/12
[58] Field of Search .............. 74/242.11 B, 242.15 B

[56] References Cited
FOREIGN PATENTS OR APPLICATIONS

| 768,793 | 8/1934 | France | 74/242.11 B |
| 358,269 | 10/1931 | Great Britain | 74/242.11 B |

*Primary Examiner*—Leonard H. Gerin
*Attorney, Agent, or Firm*—Fulwider, Patton, Rieber, Lee & Utecht

[57] ABSTRACT

A motorcycle drive chain tensioner kit including a mounting clamp for clamping to a tine formed by the rear fork of a chain driven motorcycle and having an adjustment bracket mounted therebelow, such adjustment bracket being shiftable transversely with respect to such clamp. An elongated carrier arm is mounted on its forward extremity from such bracket and projects rearwardly to have an idler spricket rotatably mounted on the rear extremity thereof for engagement with the drive chain. A torsion spring is connected between the mounting bracket and carrier arm with a tension setting device being connected therewith to adjust the torque applied by such spring and consequently the tension maintained on such drive chain. Consequently, the mounting clamp may conveniently be mounted on the motorcycle tine, the adjustment bracket adjusted transversely with respect to such clamp to align the idler sprocket with the drive chain and the tension setting device adjusted to apply the desired tension to such drive chain to take up slack therein and maintain positive engagement with the drive and driven sprockets of such motorcycle.

10 Claims, 8 Drawing Figures

PATENTED SEP 10 1974　　3,834,246
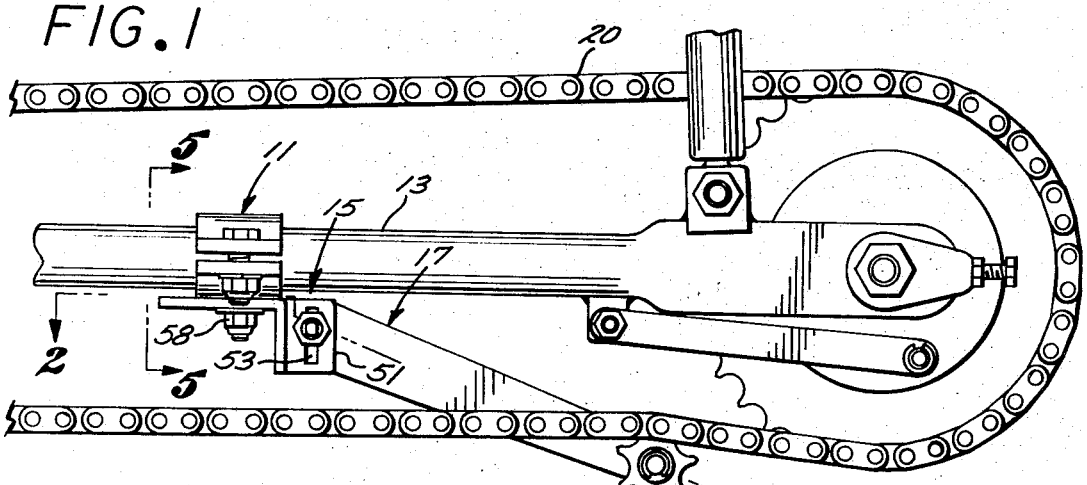
FIG.1
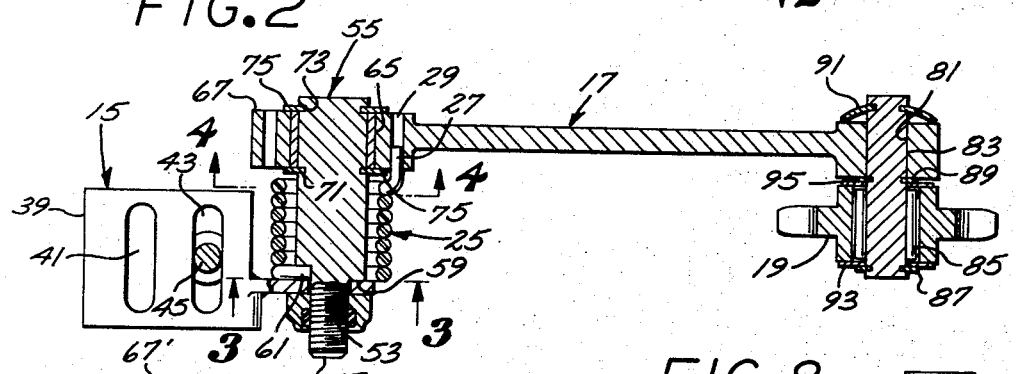
FIG.2
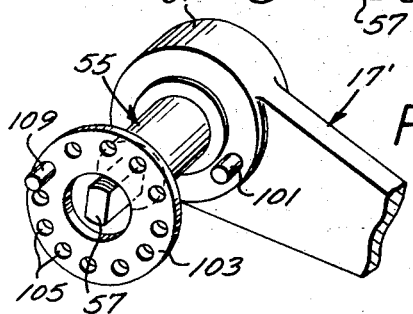
FIG.6
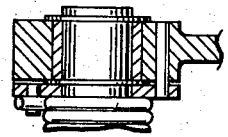
FIG.8
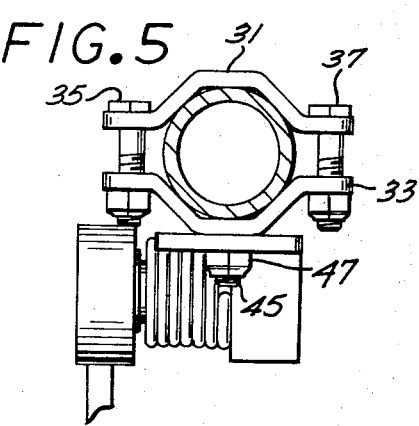
FIG.5
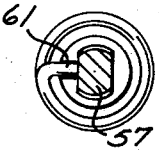
FIG.3
FIG.4
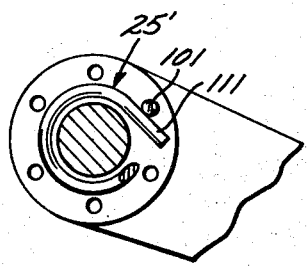
FIG.7

MOTORCYCLE DRIVE CHAIN TENSIONER KIT

BACKGROUND OF THE INVENTION

1. Field of the Invention:

The motorcycle drive chain tensioner kit of the present invention relates to a chain tensioning device which may be conveniently mounted on a motorcycle and adjusted to apply the desired degree of tension to the motorcycle drive chain.

2. Description of the Prior Art:

Conventionally the lengths of motorcycle drive chains are adjusted by removing or adding links to provide approximately the desired length of drive chain for maintaining the necessary tension to avoid such chains feeding off their sprockets at high speeds. However, since the exact length cannot be obtained and since such chains are subject to stretch and wear, a certain degree of slackness is normally experienced thus subjecting the chain to shock and consequent stretching upon acceleration of the motorcycle and also applying a certain degree of shock to the transmission on rapid acceleration. Applicant is unaware of any prior art motorcycle drive chain tensioner kits which can be conveniently installed on a motorcycle and rapidly adjusted to align the idler sprocket with the chain and the tension thereof set for the particular motorcycle and type of riding which is to be expected.

SUMMARY OF THE INVENTION

The motorcycle drive chain tensioner kit of the present invention is characterized by a pivotal carrier arm which can be rapidly mounted on a motorcycle fork and which carries an idler sprocket from the free end thereof. Lateral adjustment is provided to assure alignment of the idler sprocket with the chain and a torque setting device is incorporated which provides for adjusting the torque applied to the carrier arm and, consequently, the tension of the motorcycle drive chain.

One embodiment of the motorcycle drive chain tensioner kit incorporates a torque setting disc which may be selectively set at different clocked positions without the necessity of removing the carrier arm to thus enable adjustment of the tension without removal of the kit from the mounting clamp.

The objects and advantages of the present invention will become apparent from a consideration of the following detailed description when taken in conjunction with the accompanying drawings.

BRIEF DESCRIPTION OF THE DRAWINGS

FIG. 1 is a side elevational view of a motorcycle drive chain tensioner kit embodying the present invention and mounted on the rear fork of a motorcycle;

FIG. 2 is a longitudinal sectional view, in enlarged scale, taken along the line 2—2 of FIG. 1;

FIG. 3 is a vertical sectional view, in enlarged scale, taken along the line 3—3 of FIG. 2;

FIG. 4 is a vertical sectional view, in enlarged scale, taken along the line 4—4 of FIG. 2;

FIG. 5 is a vertical sectional view, in enlarged scale, taken along the line 5—5 of FIG. 1;

FIG. 6 is a partial perspective view of a second embodiment of the motorcycle drive chain tensioner kit embodying the present invention;

FIG. 7 is a vertical sectional view similar to FIG. 4 but taken through the motorcycle drive chain tensioner kit shown in FIG. 7; and FIG. 8 is a partial longitudinal sectional view similar to FIG. 2 but taken through the motorcycle drive chain tensioner kit shown in FIG. 7.

DESCRIPTION OF THE PREFERRED EMBODIMENT

The motorcycle drive chain tensioner kit of the present invention includes, generally, a mounting clamp 11 mounted on a tine 13 of a motorcycle fork and having an adjustment bracket 15 mounted therebeneath, such adjustment bracket being transversely adjustable with respect to such mounting clamp. Carried pivotally at its forward end from the adjustment bracket 15 is a rearwardly projecting carrier arm 17 having an idler sprocket 19 carried freely rotatable from the rear extremity thereof. Referring to FIG. 2, a coiled torsion spring, generally designated 25, is connected on one end with the bracket 15 and has its opposite extremity turned to form an axial projecting tip 27 which is selectively received in any one of a number of index bores 29. Thus, the clamp may be mounted on the tine 13 as shown in FIG. 1 and the adjustment bracket 15 adjusted transversely to the appropriate location for aligning the idler sprocket directly beneath the lower run of the chain 20 and the torsion spring 25 adjusted to provide the necessary torque for maintaining the desired tension on such chain.

The mounting clamp 11 may be of any convenient construction and that shown in the preferred embodiment is in the form of a pair of generally C-shaped clips 31 and 33 (FIG. 5) having aligned bores in the opposite extremities thereof for receipt of respective fastening nut and bolt assemblies 35 and 37.

Referring to FIG. 2, the adjustment bracket 15 is formed with a horizontally projecting flange 39 having a pair of transversely elongated slots 41 and 43 formed therein in forwardly and rearwardly spaced apart relationship for receipt of a stud projecting downwardly from the lower C-clip 33. A hex nut 47 is screwed onto the lower end of the stud 45 to hold the adjustment bracket 15 in place.

The adjustment bracket 15 is twisted to form a downwardly projecting pivot flange 51 (FIG. 1) which is formed with a vertically elongated slot 53 for receiving one end of a pivot shaft, generally designated 55 (FIG. 2). Still referring to FIG. 2, the pivot shaft 55 is conveniently formed on one extremity with a tip 57 that is flat on its diametrical opposite sides and of sufficient width to complementally fit the slot 53. A pivot shaft nut 58 is screwed onto such tip to mount the shaft 55 from the bracket 15. The rear extremity of the tip 57 defines a shoulder 59 which is cut back on one side to form a recess for receipt of one end 61 of the torsion spring 25, such end being turned to project radially inwardly to form a tail that abuts the flat side of the tip 57.

Received over the opposite end of the pivot shaft 55 is a brass bushing 65 (FIG. 2) which has an annular boss 67 forming one end of the carrier arm 17 received thereover. Formed in the periphery of the shaft 55, on the opposite ends of the bushing 65, are circumferential grooves 71 for receipt of respective snap rings 75 which hold such bushing in position.

The boss 67 has the through index bores 29 formed therein and arranged in a pattern to define a circle with its center at the axis of such pivot shaft 55.

The free end of the carrier arm 17 is formed with a through transverse bore 81 which receives one extremity of a sprocket shaft 83, the opposite extremity of such sprocket shaft having the idler sprocket 19 mounted thereon by means of a roller bearing assembly 85. Snap rings 87, 89 and 91 are provided for holding the sprocket shaft 83 in position and seals 93 and 95 are provided for sealing the bearing assembly against entry of dust and dirt.

In operation, the mounting clamp 11, adjustment bracket 15, carrier arm 17 and sprocket 19 are packaged in kit form and are available for purchase by motorcycle riders. With the adjustment capability in such chain tensioner kit, it will accommodate numerous different models of motorcycles thus substantially reducing the inventory required to accommodate different models of motorcycles. The purchaser will remove the motorcycle drive chain tensioner kit from its package and clamp the clamp 11 over the fork tine 13 with the mounting bracket 15 loosely connected thereto. The mounting clamp 11 is shifted forwardly and aft to provide the desired position for the idler sprocket 19 prior to complete tightening of the fastener bolts 35 and 37. In attaching the adjustment bracket 15, the mounting stud 45 is projected through the slot 41 or 43 providing the desired forward and rearward positioning of the arm 17 with respect to the mounting clamp 11 and such bracket 15 is shifted laterally to align the idler sprocket 19 directly beneath the lower run of the drive chain 20 to provide for uniform application of tensioning forces thereto thus avoiding uneven link wear and corresponding motorcycle sprocket wear and jumping of the chain from the motorcycle sprockets.

Prior to the final tightening down of the pivot shaft nut 58, the torsion spring 25 is set to the necessary torque for applying the desired tension to the chain. Such adjustment may be accomplished by removing the pivot shaft nut 58 and withdrawing the flat sided extremity from the slot 53 sufficiently to provide access room for positioning a winding tool between the boss 67 and spring tip 27 (FIG. 2) for winding the spring 25 to the desired torque. The spring tip 27 may then be inserted in the adjustment bore 29 corresponding with the position of such tip 27 at the desired torque and the tip 57 then again fully inserted in the slot 53, adjusted to the desired height in such slot, and the nut 58 tightened down to hold the carrier arm 17 in position with the desired torque applied thereto.

The motorcycle drive chain tensioner kit shown in FIGS. 7–9 is substantially the same as that shown in FIG. 1 except that, rather than the carrier arm 17 having the adjustment bores 29 formed in the boss 67 thereof, the boss 67' has a single open-ended bore formed therein for receipt of a removable index pin 101. Slipped coaxially over the pivot shaft 55 is an index washer 103 having a plurality of index bores 105 formed therein for selective receipt of the index pin 101. Projecting axially from the index washer 103 is an anchor pin 109 for engagement by a straightened tangentially projecting tip 111 of the torsion spring 25' (FIG. 8) to limit rotation of the adjacent end of the spring 25'.

Consequently, after the motorcycle drive chain tensioner kit shown in FIG. 7 has been installed, adjustment thereof may be accomplished by merely loosening the pivot shaft nut 58 and backing the shaft tip 57 partially out of the slot 53 to enable the index pin 101 to be removed from its bore and the washer 103 to be rotated, as by means of a spanner wrench (not shown), to wind or unwind the torsion spring 25 sufficiently to apply the necessary torque to the carrier arm 17 to provide the desired tension on the chain 20. This feature is particularly important in simplifying the the tension adjusting procedure, as well as shortening the time required for such adjustment.

From the foregoing it will be apparent that the motorcycle drive chain tensioner kit of the present invention provides an economic and effective means for maintaining a predetermined tension on a motorcycle drive chain to prevent excessive slack and consequent wear of the chain and corresponding sprockets. The idler sprocket 19 applies pressure to the exterior side of the drive chain to partially reverse articulation of the chain links to thus provide a cleaning feature for such links while maintaining the desired chain tension. It should be particularly noted that the kit of the present invention may be rapidly and conveniently mounted on numerous different models of motorcycles and adjustment thereof accomplished to apply the tensioning force centrally on the chain links to avoid unbalanced loading thereof and consequent uneven force distribution and wear.

Obviously, many modifications and variations of the present invention may be made with regard to the foregoing detailed description without departing from the spirit of the invention.

I claim:

1. A motorcycle drive chain tensioner kit for mounting on a tine formed by the fork carried on the drive wheel of a chain-driven motorcycle and comprising:

a mounting clamp receivable over said tine and including removable fastening means for fastening said clamp to said tine;

adjustment bracket for mounting from said mounting clamp and shiftable transversely with respect to said tine;

adjustment means for adjusting the transverse shifting of said bracket with respect to said clamp;

an elongated carrier arm carried pivotally on one end from said bracket and projecting along said chain to terminate in a free end;

an idler sprocket at said free end and engaging said chain;

bearing means mounting said sprocket from said free end;

a torsion spring connected between said bracket and said arm; and tension setting means for setting the level of torque of said spring whereby said clamp may be fitted over said tine, said fastening means fastened, said bracket adjusted transversely to shift said sprocket into direct alignment with said chain, and said tension setting means set to cause said sprocket to apply a preselected tension to said chain.

2. A motorcycle drive chain tensioner kit as set forth in claim 1 wherein:

said tension setting means includes a boss formed by said carrier arm, surrounding the pivot axis of said arm, and including a plurality of holes disposed about said axis and defining the circumference of a circle; and said torsion spring is anchored on one extremity to said bracket and is formed at its opposite extremity with a tip selectively receivable in said holes for applying different degrees of torque to said spring and corresponding different degrees of tension to said chain.

3. A motorcycle drive chain tensioner kit as set forth in claim 1 wherein:
said tension setting means includes a boss formed by said carrier arm, surrounding the pivot axis of said arm, and formed with an axially outwardly opening pin-receiving hole;
an index pin removably received in said hole;
adjustment disc means overlying said boss, rotatable about said pivot axis, and including a plurality of index pin holes arranged on a circle around said pivot axis for selective receipt of said index pin;
anchor means for anchoring one end of said torsion spring to said disc means; and
connecting means connecting the opposite end of said torsion spring to said bracket whereby said index pin may be removed, said disc rotated to set the tension on said arm at a new setting and said index pin re-inserted to maintain said new setting.

4. A motorcycle drive chain tensioner kit as set forth in claim 1 that includes:
vertical adjustment means for adjusting the vertical location of said one end of said carrier arm on said bracket.

5. A motorcycle drive chain tensioner kit as set forth in claim 1 that includes:
sealing means for sealing said bearing means against entry of dirt and the like.

6. A motorcycle drive chain tensioner kit as set forth in claim 1 wherein:
said bracket is formed with a polygonal, through hole;
a pivot shaft formed on one extremity with a polygonal tip received complementally in said polygonal hole and carrying said one end of said carrier arm rotatably from its opposite end; and
said torsion spring is coiled about said shaft and is anchored on one end to said carrier arm and has its opposite extremity formed to abut one side of said polygonal tip.

7. A motorcycle drive chain tnesioner device for mounting on a tine formed by the fork mounted on the drive wheel of a chain-driven motorcycle and comprising:
a mount for mounting from said tin adjacent said chain;
a pivot shaft carried on one end from said mount;
a carrier arm formed on one extremity with a boss mounted rotatable from the end of said pivot shaft opposite said one end, said arm projecting along said chain to form a free end;
an idler sprocket adjacent said free end and engaged with said chain;
bearing means carrying said sprocket from said free end;
a torsion spring surrounding said pivot shaft, connected on one end with said mount and formed on its opposite extremity with an adjustment tip;
an annular disc surrounding said pivot shaft and interposed between said spring and said boss;
anchor means for anchoring said adjustment tip to said disc;
first index means on said boss;
second index means including stops arranged on a circle about said disc and selectively engagable with said first index means to selectively stop said disc against rotation whereby said first index means may be disengaged from said first stop included in said second means and said disc rotated to set the tension on said chain at a new setting and said first index means engaged with a new second stop to maintain said new setting.

8. A motorcycle drive chain tensioner device according to claim 7 wherein:
said mount includes a clamp received over said tine and including fastening means for tightening said clamp to said tine.

9. A motorcycle drive chain tensioner device according to claim 7 that includes:
adjustment means for adjusting the position of said carrier arm transversely with respect to said tine.

10. A motorcycle drive chain tensioner device according to claim 7 wherein:
said boss includes an index hole;
said first index means includes an index pin removably received in said index hole; and
said second index means includes holes formed in said disc to define said stops.

* * * * *